May 17, 1966  W. MOSSBACK  3,251,187
MASTER CYLINDER SAFETY LOCK
Filed June 23, 1965
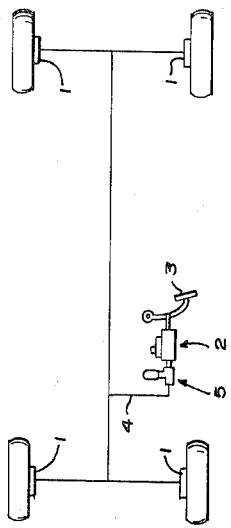
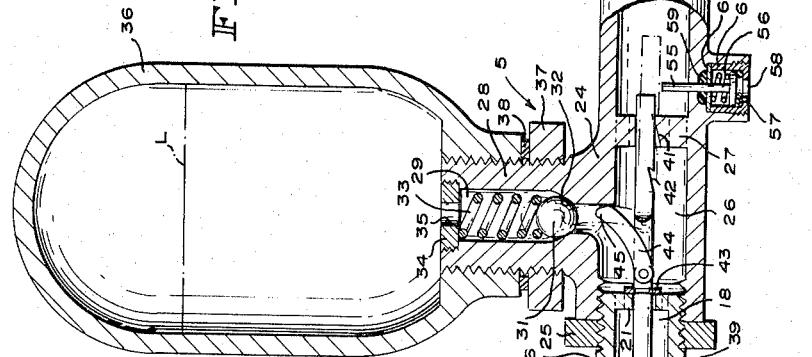
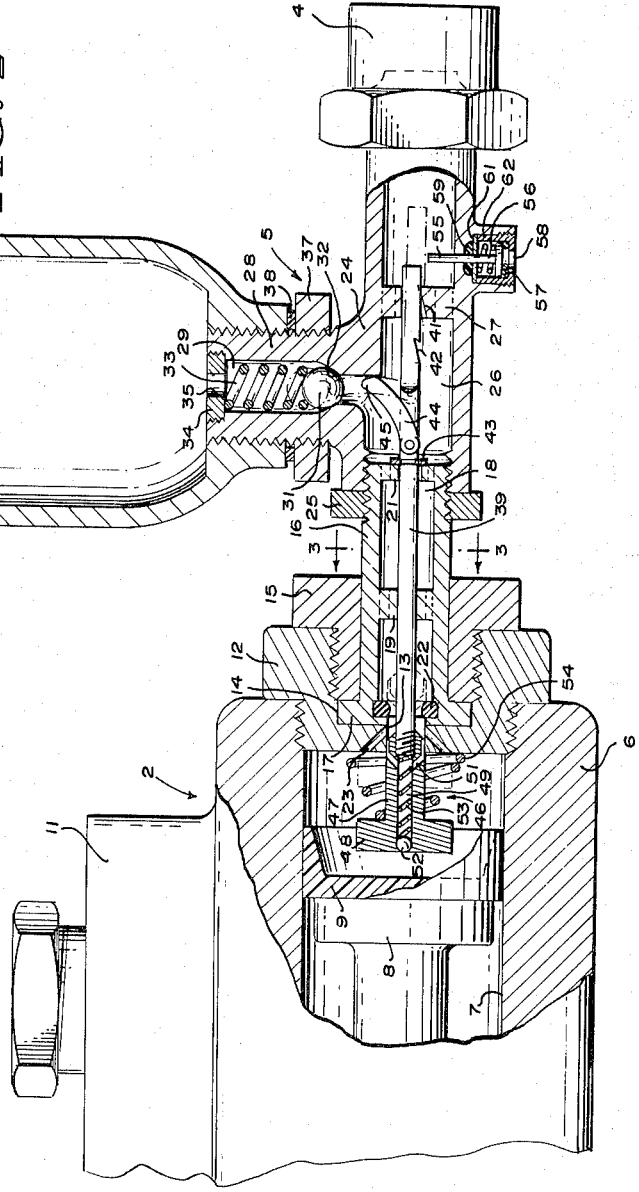
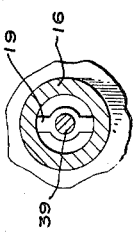
WILLIAM MOSSBACK
*INVENTOR.*
BY 
*ATTORNEYS*

United States Patent Office 3,251,187
Patented May 17, 1966

3,251,187
MASTER CYLINDER SAFETY LOCK
William Mossback, 3059 158th, Cabin B, Seattle, Wash.;
Patrick Bigham, administrator of said William Mossback, deceased
Filed June 23, 1965, Ser. No. 466,238
10 Claims. (Cl. 60—54.6)

The present invention relates to hydraulic brake systems and more particularly to a safety lock-out device for use in association with the master cylinder of a brake system for isolating the master cylinder from the system and for maintaining pressure in the system in the event of a master cylinder failure.

In the past, many fatal automobile accidents have been caused as a result of brake failure due to a faulty master cylinder which resulted in a complete loss of pressure in the brake system. Although devices have been conceived in the prior art for guarding against failure in hydraulic brake systems, these devices usually involve complicated auxiliary systems for creating fluid pressure and transmitting the same to the wheel cylinders independently of the master cylinder. The present invention contemplates a simplified attachment for master cylinders which acts to maintain a reservoir of pressurized fluid that is released upon the loss of "pedal" beyond a predetermined danger point. In addition, the present device serves to completely isolate the master cylinder from the rest of the system upon release of the stored pressure fluid while at the same time accepting any amount of pressure fluid from the master cylinder which may still be available. Thus the pressure in the system may not be lost through the master cylinder yet advantage may be taken of whatever capacity the master cylinder has to create pressure. The pressure fluid stored for emergency use is also maintained at a level which does not exceed the pressure utilized during normal braking to any substantial extent.

The primary object of the present invention is, therefore, to provide a simplified but efficient device for emergency brake application and blocking off of the master cylinder in a fluid brake system upon failure of the master cylinder for any reason.

Another object of the present invention is to provide a system for making available additional fluid under pressure to automatically set the brakes of the system upon loss of "pedal" beyond a predetermined point.

A further object of the present invention is to provide a safety device which will provide pressure fluid to lock the brakes upon failure to maintain fluid in the master cylinder or upon rupture of the packing cup of the master cylinder.

A further object of the invention is to provide a device of the character described which is effective to block off the master cylinder from the system in case of master cylinder failure and to provide fluid under pressure to set and hold the brakes of the system and yet operate to accept any pressure fluid still available from the master cylinder.

Still further objects and advantages of the invention will become apparent from the following specification and drawings wherein:

FIG. 1 is a diagrammatic illustration of a typical brake system showing the location of the master cylinder and safety lock device of the invention;

FIG. 2 is a cross sectional view of the safety lock mechanism; and

FIG. 3 is a cross sectional view taken along lines 3—3 of FIG. 2.

Referring now to the drawings wherein like reference numerals indicate identical parts on the various views, FIG. 1 illustrates a typical brake system wherein individual wheel brake cylinders, indicated schematically at 1, are actuated by means of a conventional master cylinder 2 operated by the brake pedal 3 for producing fluid pressure in the brake lines 4. As illustrated, the safety lock device 5 of the present invention is located in the brake line 4 at the outlet end of the master cylinder.

The structural details of the safety lock device and its cooperation with the master cylinder are set out in FIG. 2. As is conventional, the master cylinder 2 provides a cylindrical housing 6 with a bore 7 to accommodate the movement of the piston member 8 having a deformable packing cup 9. The piston 8 is reciprocated within the bore 7 by means of the brake pedal 3 in a well known manner to supply fluid under pressure to the brake line 4. The master cylinder 2 will also be provided with a conventional reservoir, indicated generally at 11, with the necessary valving (not shown) for trapping fluid ahead of the packing cup as will be well understood by those skilled in the art. Since the actual details of the master cylinder construction form no part of the present invention and any conventional master cylinder available in the art will suffice, such details are not illustrated. It is only necessary to point out that pressure fluid is forced ahead of the cup 9 and into the brake lines 4 by movement of the piston 8.

As illustrated, the safety lock device 5 of the present invention is fitted directly to the outlet end of the master cylinder and is mounted in a screw threaded fitting 12 threadably engaged in the end of the master cylinder. It will be understood, of course, that any conventional means of providing a fluid seal between the fitting 12 and the housing 6 of the master cylinder may be utilized. The fitting 12 has a central bore 13 and a counter bore 14 having a screw threaded portion for receiving a gland nut 15 therein. The gland nut 15 serves to mount an outlet nipple 16 to the master cylinder with the gland nut being tightened against a flange 17 received in the counter bore of the fitting 12. The nipple 16 may be of a cast construction having a center bore or passage 18 for the flow of pressure fluid from the master cylinder and includes an integral bushing 19 for mounting an actuator rod presently to be described. The bushing 19 is shown in detail in FIG. 3 and is so formed as to maintain the actuator rod centrally located within the bore while allowing pressure fluid to flow therepast. The nipple 16 also includes a second bushing member 21 located adjacent the outlet of the nipple which may be identical in structure to the bushing 19 and for a like purpose. Mounted at the opopsite end of the nipple 16 is a deformable O-ring seal 22 which may be seated in an annular groove as illustrated.

Under normal operation, i.e. with the master cylinder functioning properly, pressure fluid is forced from the bore 7 of the master cylinder through a plurality of passages 23 in the fitting 12 and exits through the bore of the nipple 16.

A casing 24 is screw threaded on the end of the nipple 16 and is connected to the brake line 4 as illustrated. A lock nut 25 may be tightened against the casing 24 to lock it into position. The casing 24 also includes a central bore or passage 26 which communicates with the passage 18 and the brake lines 4. A third bushing 27 is formed in the passage 26 and may be substantially identical in structure to the bushing 19 as described. Thus the pressure fluid normally passes through the passages 23, 18 and 26 to the brake line 4.

Integral with the casing 24 is an upstanding externally threaded fitting 28 having a vertical passage 29 which communicates with the passage 26 of the casing. A ball valve 31 is located in the passage 29 so as to be normally seated against a suitable valve seat 32 at the lower end of the passage as illustrated. The ball 31 is biased against the seat by means of a spring 33 with a screw threaded ring 34 providing a seat for the spring. The ring 34 may be screw threaded into the fitting 28 and includes a central opening 35. The passage 29 and opening 35 communicate with the interior of a hollow dome 36 which provides a closed chamber for the reception of pressure fluid as will presently be described. The dome 36 may be of any configuration so as to provide a closed chamber and will normally be of a cast construction with a screw threaded opening for mounting on the fitting 28 as illustrated in FIG. 2. A lock nut 37 may be tightened against a suitable annular seal 38 to secure the dome on the fitting 28. Since the volume of the dome 36 determines the amount of reserve fluid and the quantity of compressible air, some adjustment of the capacity of the dome may be effected by adjusting the position of the dome on the fitting 28 and then locking the dome at the chosen position with the lock nut 37. With this structure the ball 31 may be unseated by pressure fluid acting against the spring 33 and the ball valve will normally prevent any flow of fluid from the dome 36 to the brake lines.

An actuator rod 39 is mounted within the passages 18 and 26 of the nipple 16 and casing 24 respectively and is received by the bushings 19, 21 and 27 for limited reciprocal movement. As illustrated in FIG. 2, the rod 39 is in the unactuated position and extends from the fitting 12 to a position a slight distance beyond the bushing 27. It is also to be noted that the bushing 21 provides clearance to allow a slight amount of lateral deflection of the rod in its longitudinal movement for a purpose to be described. The bottom wall of the hole in the bushing 27 is slightly inclined upwardly as illustrated at 41 for the purpose of allowing the rod 39 to be locked in the actuated position by the cooperation of a notch 42 in the rod with the edge of the incline wall 41. A stop collar 43 is fixed by any suitable means on the rod 39 so as to limit the return travel of the rod in the left hand direction as illustrated in FIG. 2.

A trigger member 44 is pivotally mounted on the actuator rod 39 adjacent the stop member 43 and may be made slightly arcuate in shape with a curved end portion 45 which rests against the lower end of the wall of the passage 29 when the actuator rod is in the unactuated position shown in FIG. 2. As will be obvious, when the actuator rod 39 is advanced the trigger 44 will be pivoted upwardly to contact and unseat the ball 31 as shown by the dotted line portion in FIG. 2. Since the ball 31 is biased by the spring 33, a certain amount of downward pressure will be acting on the rod 39 to deflect it slightly in a downward direction, as shown in dotted lines, to cause the notch 42 to engage the inclined surface 41 of the hole in the bushing 27. In this position, the actuator rod and the trigger hold the ball 31 unseated to allow flow of pressure fluid from the dome 36 to the brake lines 4.

A contact member indicated generally at 46 is screw threaded on the left hand end of the rod 39 and includes a cylindrical body 47 and a contact head 48. It will be noted that the outside diameter of the body portion 47 is such as to allow the contact member to pass through the bore 13 in the fitting 12. It will also be noted that, in the unactuated or return position, the end of the body portion 47 allows for free passage of fluid through the passages 23 of the fitting and into the passage 18 and thence to the brake lines. The contact member 46 also includes a central bore or passage 49 with a plurality of annular passages 51 providing communication between the bore 49 and the outside surface of the body 47 of the member. A ball 52 is seated against a suitable valve seat at the entrance of the bore 49 and is spring biased into the closed position by means of a compression spring 53. The actuator rod 39 is held in the extreme left hand position illustrated in FIG. 2 by means of a helical return spring 54 which seats against the head 48 and the inside face of the fitting 12.

Turning now to the operation of the device, it will first be understood that during normal operation of the master cylinder, and assuming that the reservoir of the master cylinder is properly filled with brake fluid, when the foot pedal 3 is depressed, the piston 8 will displace sufficient hydraulic fluid through the brake lines 4 to effect braking under all conditions. The cup 9 of the master cylinder will normally remain out of contact with the head 48 of the contact member 46. It will be understood, of course, that the stopping position of the piston head 8 and cup 9 may vary over a period of time in the event that fluid is lost from the system without being replenished to the master cylinder reservoir or in the event of wear on the brake shoes requiring more fluid in the system.

When the dome 36 is initially installed as illustrated, fluid is pumped into the dome by pumping the brake pedal with the pressure fluid serving to unseat the ball valve 31 allowing the fluid to enter the doom. Since the dome is entirely closed, the fluid entering the dome will compress the air in the dome as the fluid level raises to some point L. Each time the brake pedal is depressed and released, additional fluid is trapped in the dome and prevented from escaping by means of the ball valve 31 thus maintaining the fluid within the dome under pressure of the compressed air. Once the dome has been thus charged, the reservoir of the master cylinder will be filled and the system is ready to function. At this point it is to be noted that the presence of the air chamber in the dome 36 will provide means for escape of any air trapped in the system as a result of the installation of the locking device. Thus any air bubbles in the brake line or in the passages 18 and 26 will be forced into the air chamber making further bleeding of the brake lines unnecessary. During regular usage, the pressure on the fluid within the dome will be maintained at the maximum pressure which is applied to the brake lines through the master cylinder operation minus the pressure exerted on the ball valve by means of the spring 33. Thus the available pressure in the dome will never exceed that used during even emergency braking and, in fact, will be substantially less because of the spring 33. This will assure that, even though the full pressure of the fluid within the dome 36 is released it will normally be less than that required to cause skidding of the automobile.

It is well known that most master cylinder failures are caused by rupturing of the deformable cup 9, the material of which may deteriorate over a period of time. The rupturing of the cup 9 is commonly referred to as "blowing" a master cylinder and the result is that the piston 8 is allowed to travel to the end of the cylinder without effecting braking and the pressure fluid in the system merely leaks back past the piston. In the present system, the blowing of the master cylinder cup results in the piston and cup contacting the member 48 which drives the actuator rod 39 to the right as viewed in FIG. 2 to cause the trigger member 44 to move upwardly and unseat the ball valve 31. As the contact member 46 moves to the right, the passages 23 are blocked off by the body 47 and the O-ring 22 forms a fluid tight seal thereabout. The master cylinder is, in this way, sealed off from the rest of the system to prevent leakage of fluid in the system back of the master cylinder. The rod 39 is so positioned that the master cylinder will be sealed off by the O-ring 22 prior to the unseating of the valve 31 to insure that no pressure fluid is lost. With the master cylinder isolated, the fluid under pressure in the dome 36 is released into the system to effect emergency braking. It will also be observed that, as the actuator rod 39 moves to the right, the rod will be deflected downwardly as the trigger 44 contacts the ball for the purpose of engaging the notch 42 with the inclined wall 41 of the bushing 27 thus holding the actuator rod in the actuated position. The brakes of the vehicle are then locked against release.

In some instances it may be that some pressure is created ahead of the ruptured master cylinder cup 9 and it is desirable to transfer this pressure fluid to the brake lines. The ball valve 52 will be unseated by this pressure when it exceeds the pressure in passage 18 to allow the fluid in the master cylinder to pass through the bore 49 and passages 51. The passages 51, at this time, are located past the O-ring seal 22 so that the bore 49 is in communication with the passage 18.

In order to release the brakes, a release pin 55 is located in the wall of the casing 24 in vertical alignment with the actuator rod 39, with the pin 55 being spring pressed to the release position shown in FIG. 2 by means of the spring 56. The pin 55 is sealed with relation to the casing 24 by means of an O-ring 57 against which the head of the pin normally seats. Access to the pin 55 is gained through an opening 58 below the head thereof. An additional seal about the pin 55 is provided by the O-ring 59 which is expanded by means of the pressure plate 61 against which the gland 62 is screw tightened. In order to release the actuator rod 39, it is merely necessary to insert the pin 55 into contact with the end of the rod to disengage the notch 42 and allow the spring 54 to return the rod.

Although the safety lock device has been described as functioning as the result of a ruptured master cylinder cup, it will be obvious that failure to maintain a supply of fluid in the master cylinder will also cause actuation of the system. It is a common fallacy of automobile owners to allow the master cylinder reservoir to be emptied over a long period of time resulting in a final complete loss of brake pedal. Although the brakes may function during normal usage by pumping, they may be completely inadequate for emergency purposes. In the event of an emergency the driver will depress the brake pedal completely to the floor resulting in contact between the master cylinder piston and the contact member 48 which actuates the safety lock device as previously described.

From the foregoing it will be obvious that the present invention provides significant improvements in safety lock devices for fluid pressure brake systems of the character described. The arrangement and types of structural components utilized herein may be subjected to numerous modifications well within the purview of this invention and applicant intends only to be limited to a liberal interpretation of the specification and appended claims.

Having thus described the invention, what is claimed as new and desired to be secured by Letters Patent is:

1. In a fluid pressure brake system including a master cylinder having a piston to produce fluid pressure, a master cylinder safety lock device comprising in combination; means providing a closed air chamber in said system for the reception of pressure fluid from the system to compress the air in the chamber, spring biased check valve means to normally prevent the escape of pressure fluid from the chamber, actuator means responsive to movement of said piston beyond a predetermined point to unseat said valve, seal means cooperating with said actuator means to seal said master cylinder from the system when said valve is unseated, and catch means for holding said actuator in the actuated position, whereby fluid under pressure of said compressed air will be released to said system and said master cylinder will be isolated so as to maintain pressure in the system upon travel of the piston beyond said predetermined point.

2. The combination according to claim 1 including; a passage in said actuator means, said passage being positioned to communicate with said master cylinder and the pressure conduit of the system when the actuator means is in the actuated position, and spring biased check valve means in said passage normally seated against back flow of pressure fluid from the conduit, said valve being opened to accept pressure fluid from said master cylinder when the fluid pressure in the master cylinder exceeds the fluid pressure in the system.

3. The combination according to claim 2 including; manual means for selectively releasing said catch means.

4. In a fluid pressure brake system including a master cylinder having a piston to produce fluid pressure, a master cylinder safety lock device comprising in combination; means providing a closed chamber, a passage connecting said chamber with the fluid pressure conduit at the outlet end of the master cylinder, spring biased check valve means in said passage, normally closed to prevent flow of fluid from the chamber to the pressure conduit, actuator means mounted in the pressure conduit for unseating said valve, said actuator means including a contact portion extending into the master cylinder, spring means for holding said actuator means in the unactuated position, the contact portion of said actuator being contacted by the master cylinder piston upon travel thereof beyond a predetermined point to move the actuator means to unseat said valve, seal means to seal off the master cylinder from the system upon opening of the valve, and catch means for holding the actuator means in the actuated position.

5. The device according to claim 4 including; second passage means in said contact portion, said second passage means being positioned to communicate with said master cylinder and the pressure conduit when the actuator means is in the actuated position, and spring biased check valve means in said second passage means normally seated against back flow from the conduit, said check valve means being opened to accept pressure fluid from said master cylinder when the fluid pressure in the master cylinder exceeds the fluid pressure in the pressure conduit.

6. The device according to claim 5 including; manual means for selectively releasing said catch means.

7. In a fluid pressure brake system having a master cylinder including a piston with said master cylinder being connected in the system to produce fluid pressure therein, a master cylinder safety lock device comprising; a hollow air filled dome connected to the pressure conduit at the outlet end of said master cylinder, a passage connecting the interior of said dome with the fluid pressure conduit, a spring biased check valve in said passage normally closed to prevent flow of fluid from the dome to the pressure conduit, an actuator rod mounted for limited reciprocal movement in the pressure conduit and including a contact portion extending into the master cylinder, trigger means on said rod for unseating said check valve, spring means for moving said rod to the unactuated position to maintain said trigger out of contact with said valve, the contact portion of said rod being contacted by the master cylinder piston upon travel beyond a predetermined point for actuating said rod to move the trigger to unseat said valve, seal means about said contact member to seal off the master cylinder from the system when said valve is unseated, and catch means for holding the rod in the actuated position.

8. The device according to claim 7 including; second passage means in said contact portion, said second passage means being positioned to communicate with said master cylinder and the pressure conduit when the actuator rod is in the actuated position; and spring biased check valve means in said second passage means normally seated against back flow from the conduit, said check valve means being opened to accept pressure fluid from said master cylinder when the fluid pressure in the master cylinder exceeds the fluid pressure in the pressure conduit.

9. The device according to claim 8 including; manual means for selectively releasing said catch means.

10. The device according to claim 9 wherein; said catch means comprises a notch in said rod, a bushing formed in said conduit including a hole for receiving said rod, the wall of said hole being inclined so as to engage said notch when the rod is moved to the actuated position, said rod being deflected downwardly by the bias of the spring acting on said check valve, said manual means for releasing said catch comprising an insertable spring returned pin for engaging the rod to release the catch.

No references cited.

SAMUEL LEVINE, *Primary Examiner.*